(12) United States Patent
Henry

(10) Patent No.: US 10,906,117 B2
(45) Date of Patent: Feb. 2, 2021

(54) SYSTEM AND METHOD FOR PROVIDING WELDING TYPE POWER ON MULTIPLE OUTPUTS

(71) Applicant: Illinois Tool Works Inc., Glenview, IL (US)

(72) Inventor: Andrew J. Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 294 days.

(21) Appl. No.: 15/883,148

(22) Filed: Jan. 30, 2018

(65) Prior Publication Data

US 2019/0232414 A1 Aug. 1, 2019

(51) Int. Cl.
| | |
|---|---|
| *B23K 9/10* | (2006.01) |
| *B23K 9/167* | (2006.01) |
| *B23K 9/14* | (2006.01) |
| *B23K 9/095* | (2006.01) |
| *B23K 9/173* | (2006.01) |
| *B23K 9/12* | (2006.01) |

(52) U.S. Cl.
CPC .......... *B23K 9/1068* (2013.01); *B23K 9/0953* (2013.01); *B23K 9/12* (2013.01); *B23K 9/14* (2013.01); *B23K 9/167* (2013.01); *B23K 9/173* (2013.01)

(58) Field of Classification Search
CPC ...... B23K 9/1069; B23K 9/0953; B23K 9/12; B23K 9/14; B23K 9/167; B23K 9/173
See application file for complete search history.

(56) References Cited

U.S. PATENT DOCUMENTS

| | | | |
|---|---|---|---|
| 3,609,282 A * | 9/1971 | Trattner | B23K 9/167 219/75 |
| 6,115,273 A | 9/2000 | Geissler | |
| 6,987,242 B2 | 1/2006 | Geissler | |
| 7,682,208 B2 | 3/2010 | Bankstahl | |
| 2008/0035621 A1* | 2/2008 | Veik | B23K 9/1068 219/130.1 |
| 2009/0230941 A1 | 9/2009 | Vogel | |
| 2014/0263240 A1 | 9/2014 | Henry | |

FOREIGN PATENT DOCUMENTS

| | | | |
|---|---|---|---|
| EP | 1023965 A2 * | 8/2000 | ........... B23K 9/1043 |
| JP | S5092247 | 7/1975 | |

OTHER PUBLICATIONS

Shopmaster™300 AC/DC, OM-322, Owner's Manual, Apr. 2002 (32 pgs).
Int'l Search Report and Written Opinion Appln No. PCT/US2019/013581 dated Jun. 21, 2019.
Int'l Preliminary Report on Patentability Appln No. PCT/US2019/013581 dated Aug. 13, 2020.

* cited by examiner

*Primary Examiner* — Jeremy Carroll
(74) *Attorney, Agent, or Firm* — McAndrews, Held & Malloy, Ltd.

(57) ABSTRACT

A method and apparatus for providing welding type power on one of at least two output terminals is disclosed. Input power is received and welding type power is derived and provided by a shared power circuit. The welding type power is provided across a shared terminal and only two process terminals in response to a desired process. The desired process can be set bu user input, feedback, or sensing working connections. The process terminal is selected by selectively opening and closing at least two controllable switches.

18 Claims, 7 Drawing Sheets

SYSTEM AND METHOD FOR PROVIDING WELDING TYPE POWER ON MULTIPLE OUTPUTS

FIELD OF THE INVENTION

The present disclosure relates generally to the art of providing welding type power. More specifically, it relates to providing welding type power across a shared output terminal and one of two or more output terminals.

BACKGROUND OF THE INVENTION

Many applications exist for welding and cutting systems used to join two or more work pieces to one another, or to cut work pieces. These applications exist throughout industry, but also for construction, ship building, maintenance, and so forth. In arc welding systems, electrical power is converted to a form useful for a welding process, and the power provides voltage and current necessary to establish and maintain arcs between an electrode and a workpiece. Examples of welding processes include MIG (also called GMAW), TIG, stick (SMAW), short-arc, subarc, and FCAW. MIG welding is performed by establishing an arc between an electrode (welding wire) that is advanced towards the workpiece and the workpiece itself. The electrode is often provided by a wire feeder, that is part of the welding-type system. The electrode is consumed insomuch as it is added to the weld as the weld puddle advances during the operation. TIG welding is performed by establishing an arc between a tungsten electrode that is not consumed by the welding process. Stick welding is performed by establishing an between a flux covered electrode that is consumed by the welding process. Stick and TIG welding can often be performed using the same cable. Some applications are best performed using a specific welding process, and other applications are best performed using other specific welding processes. Plasma cutting and similar operations also require conditioned power adapted for the specific process.

Some welding systems are designed to perform multiple processes and include a power circuit suited for providing an output for multiple processes. One such power circuit is described in US Patent Application 2014-0263240 (hereby incorporated by reference). That design includes a preregulator which provides a dc bus, followed by an inverter based output circuit. The preregulator conditions the input power, and provides a known dc bus. The inverter based output circuit receives the bus and provides the welding type power as a desired output for the selected process. A boost circuit is part of the preregulator, and the output circuit includes an inverter, transformer, rectifier and output inductor. Other examples of similar welding type power supplies are described in U.S. Pat. No. 6,987,242 (Geissler), U.S. Pat. No. 6,115,273 (Geissler) and Patent Publication 20090230941 (Vogel), all which are owned by the owner of this patent, and all of which are hereby incorporated by reference. Other welding type power supplies include additional stages, or use other topologies for each stage (such as a buck preregulator, a combined rectifier-boost preregulator, a chopper instead of or following the inverter, a second inverter following the first inverter, etc. These welding type systems are well suited for providing power for a variety of processes, from a variety of inputs.

Common multi process welding systems provide MIG and stick/TIG outputs. The MIG output is typically provided to a wire feeder on a MIG process output terminal, and the stick/TIG output is typically provided on a separate stick/TIG process output terminal. Process output terminal, as used herein, refers to an output terminal intended to be used for one or more particular processes, such as a MIG terminal, or a stick/tig terminal. The work output terminal is often a shared output terminal used when welding with either process. Shared output terminal, as used herein, refers to an output terminal (or terminals that are electrically connected such that both receive the same power) used with more than one other output terminal and for multiple processes, such as a work terminal used with both a wire feeder terminal and a stick/tig terminal.

Some prior art multi process welders provide an output to both terminals, and rely on the user connecting to the proper terminal, and not having a connection on the other terminal because it receives power as well. This can be undesirable because an unused terminal is hot. Other multi process systems can use a shared process output terminal for multiple processes. This can be undesirable because it requires the user change what is connected to the terminal (a stick/TIG cable or a wire feeder) every time the process changes. Other multi process systems (such as the Miller ShopMaster) use a knife switch which the user throws to select which process output terminal is being used. This can be undesirable because it requires the user to take the extra step of setting the switch in the proper position.

Accordingly, a multi process welder that automatically provides the desired power to the correct process output terminal is desired.

SUMMARY OF THE PRESENT INVENTION

According to a first aspect of the disclosure a welding type system for providing welding type power includes a process selection input, a welding type power circuit, a shared output terminal, first and second process output terminals, and a controller. The welding type power circuit includes a shared power circuit and first and second controllable switches. The shared power circuit produces welding type power. The controllable switches have control inputs connected to receive the welding type power from the shared power circuit. The shared output terminal is also connected to receive the welding type power from the shared power circuit. The first process output terminal is connected to the first controllable switch such that when the first controllable switch is closed the first process output terminal receives the welding type power from the shared power circuit such that the welding type power is provided across the shared output terminal and the first process output terminal, and when the first controllable switch is open the first process output terminal does not receive the welding type power from the shared power circuit. The second process output terminal is connected to the second controllable switch such that when the second controllable switch is closed the second process output terminal receives the welding type power from the shared power circuit such that the welding type power is provided across the shared output terminal and the second process output terminal, and when the second controllable switch is open the second process output terminal does not receive the welding type power from the shared power circuit. The controller includes a process selection module, and the controller is connected to receive the process selection input. The process selection module is responsive to the process selection input and has first and second control outputs, each having an enable state and a disable state. The first control output is connected to the control input on the first switch, and the second control output is connected to the control input on the second switch. No more than one of the first control output and the second control output can be in the enable state at any one time.

The shared output terminal is a work terminal in one alternative.

The welding type system also includes a work inductor connected between the second process output terminal and the shared power circuit, and/or a high frequency starting coil connected between the first process output terminal and the first controllable switch in another alternative.

The first process output terminal is a push and twist style receptacle and provides a stick and/or tig output, and the second process output terminal provides a MIG output, and the process selection input is a user input for selecting mig, tig and/or stick in one embodiment.

The controllable switches are semiconductor devices, electro mechanical devices, and/or vaccuum tubes in various embodiments.

The user input is a selection switch, a selection knob, buttons, a selection menu, a touch screen, and/or a selection program in another alternative.

The process selection input can be responsive to a signal indicative of a working connection being made to at least one of the first process output terminal and the second process output terminal, a trigger, a foot pedal, and/or a finger tip control in various embodiments.

The process selection input includes a disable module that is responsive to feedback indicative of welding type power being provided to one of the process terminals in one alternative.

The shared power circuit includes a preregulator with a boost circuit, an inverter and a transformer, with the output of the boost circuit being a boosted bus provided to the inverter, and the output of the inverter provided to the transformer, and the output of the transformer provided to the controllable switches in another alternative.

The welding type system includes a polarity selection input in one embodiment. The first controllable switch and the second controllable switch are connected to receive a first polarity of the welding type power from the shared power circuit. The welding type power circuit further includes third and fourth controllable switches having control inputs, and connected to receive a second polarity of the welding type power from the shared power circuit. The controller receives the polarity selection input and has a polarity selection module responsive to the polarity input. The controller also has third and fourth control outputs having the enable state and the disable state, and being responsive to the polarity selection module. The third and fourth control outputs are connected to the control inputs on the third and fourth switches, respectively. No more than one of the third control output and the fourth control output can be in the enable state at any one time.

The polarity selection input is at least one of a polarity selection switch, a polarity selection knob, buttons, a polarity selection menu, a touch screen, and a selection program in various embodiments.

The first process output terminal is connected to the third controllable switch such that when the third controllable switch is closed the first process output terminal receives the second polarity of the welding type power from the shared power circuit, and the second process output terminal is connected to the fourth controllable switch such that when the fourth controllable switch is closed the second process output terminal receives the second polarity of the welding type power from the shared power circuit in another alternative. Each first control output is responsive to the polarity selection module and the process selection, wherein no more than one of the first control output, the second control output, the third control output, and the fourth control output are in the enable state at one time in this alternative.

The third and fourth controllable switches are semiconductor devices in another alternative.

The third and fourth controllable switches are connected between the shared power circuit and a node common to the first and second controllable switches such that when the first control output and the third control output are enabled the first process output terminal receives the first polarity of the welding type power from the shared power circuit, and when the first control output and the fourth control output are enabled the first process output terminal receives the second polarity of the welding type power from the shared power circuit, and when the second control output and the third control output are enabled the second process output terminal receives the first polarity of the welding type power from the shared power circuit, and when the second control output and the fourth control output are enabled the second process output terminal receives the second polarity of the welding type power from the shared power circuit in one embodiment.

The first switch and the second controllable switch are electro mechanical devices in various embodiments.

According to a second aspect of the disclosure a method of providing welding type power includes sensing a process selection input, receiving input type power, and providing welding type power from a shared power circuit. The welding type power from the shared power circuit is provided across a shared work terminal and one of a first process terminal and a second process terminal in response to sensing the process selection input, by closing and opening of first and second controllable switches.

Sensing the process selection input includes sensing a user input indicative of MIG, tig and/or stick in one embodiment.

Sensing the process selection input includes sensing a selection switch, a selection knob, buttons, a selection menu, a touch screen, and /or a selection program in another embodiment.

Sensing the process selection input includes sensing a signal indicative of a working connection being made to at least one of the first process output terminal and the second process output terminal, a trigger, a foot pedal, or a finger tip control in various embodiments.

The method of providing welding type power includes preventing changes to the state of the first controllable switch and the second controllable switch while welding power is being provided to one of the process terminals in another embodiment.

Other principal features and advantages of will become apparent to those skilled in the art upon review of the following drawings, the detailed description and the appended claims.

Figure 1:
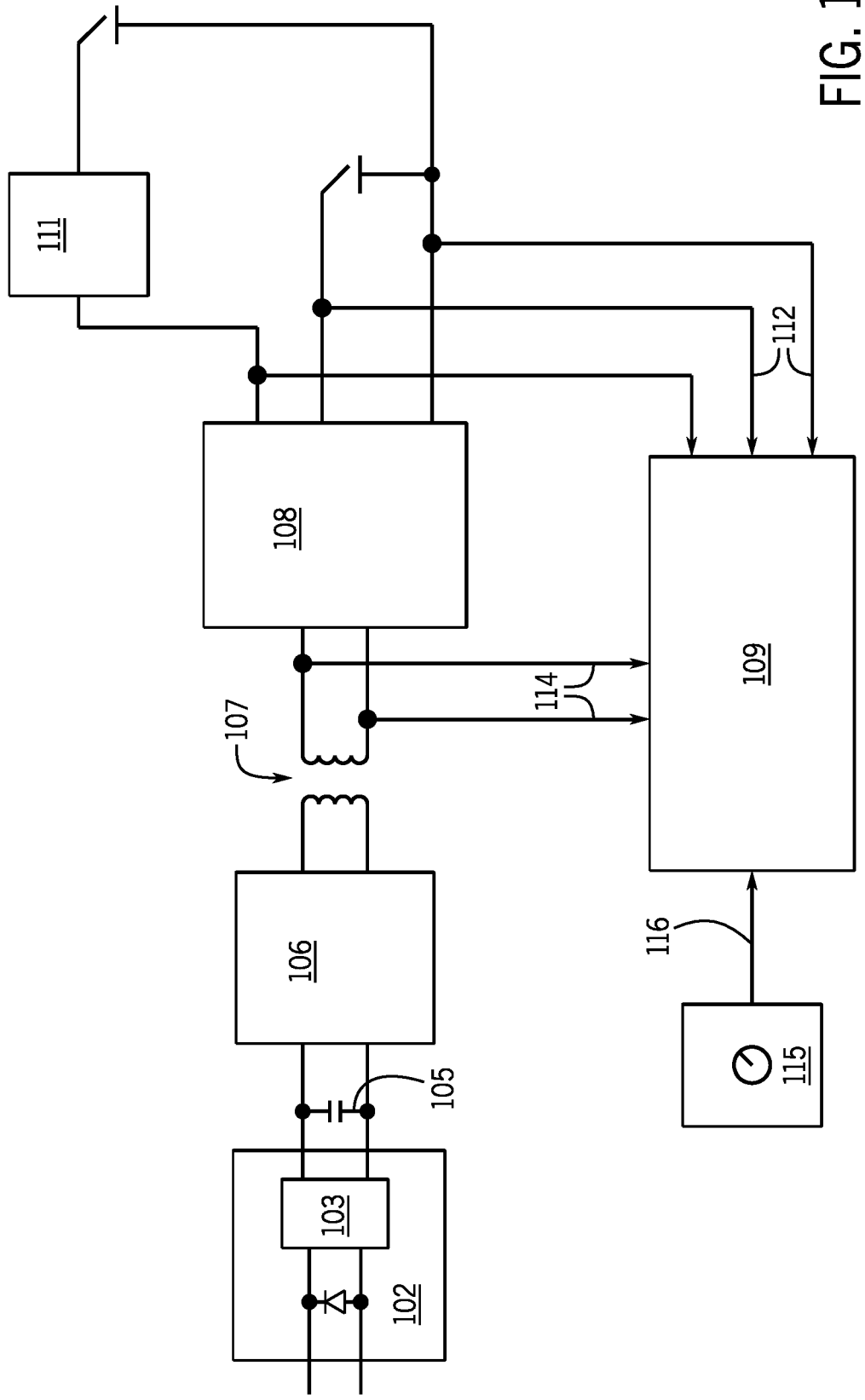
FIG. 1 is a block diagram of a welding type system in accordance with the preferred embodiment.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to a particular welding type system having particular components and topologies to provide outputs for particular processes, it should be understood at the outset that the invention can also be implemented with other welding type systems, using other components and topologies, and providing other processes.

Generally, a welding type system with two process output terminals is described. A welding-type output is provided across one of the process output terminals and a shared output terminal. A controller in the welding type system automatically provides the output to the corrected process output terminal in response to a process selected on a process selection input. Welding type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith. Welding type power, as used herein, refers to power suitable for welding, plasma cutting, induction heating, CAC-A and/or hot wire welding/preheating (including laser welding and laser cladding). Process selection input, as used herein, refers to a signal that indicates one of two (or more) processes is a desired process.

A welding type system 100 shown in FIG. 1 includes a preregulator 102, a bus 105, an inverter 106, a transformer 107, a process/polarity switching circuit 108, and controller 109, a wire feeder 111, and a user interface 115. Preregulator 102 includes a rectifier and a boost circuit 103. Boost circuit 103 provides a boosted bus 105 across one or more capacitors. Boosted bus 105 is provided to inverter 106, which inverts and PWMs boosted bus 105 and provides it to the primary of transformer 107. The secondary (or output) of transformer 107 is provided to switching circuit 108, which, as described below, connects the welding type power to a desired output terminal and in some embodiments at a desired polarity. Process/polarity witching circuit, as used herein refers to a circuit that selects a process output terminal and a polarity (or alternates polarity) in response to a logic circuit and a process selection and a polarity selection.

The preferred embodiment provides that preregulator 102, bus 105, inverter 106, and transformer 107 are consistent with the design shown in US Patent Application 2014-0263240. Also, this circuitry is part of a shared power circuit that produces welding type power. Welding type power circuit, as used herein, refers to power circuitry that receives an input power and provides welding-type power. Shared power circuit, as used herein, refers to a portion of a welding type power circuit that provides welding type power for more than one process to more than one output terminal, in addition to a work terminal.

Figure 2:
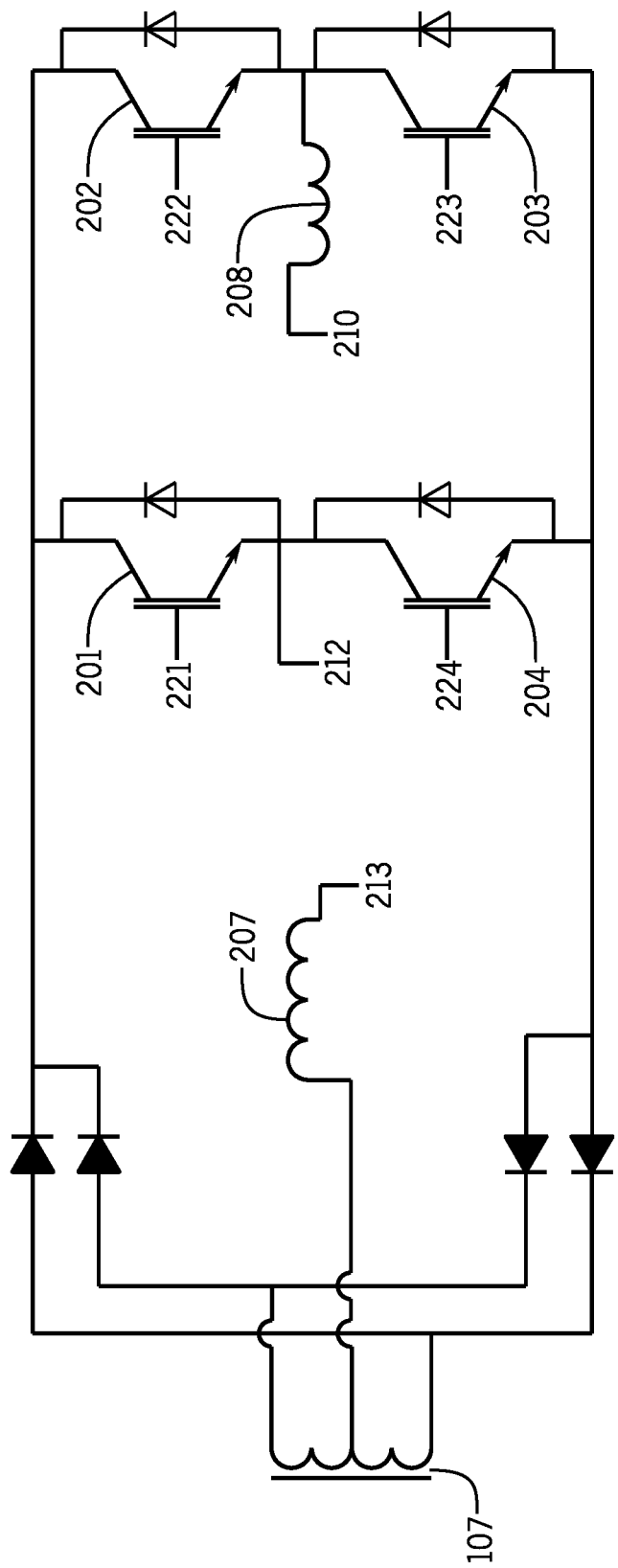
FIG. 2 is a schematic diagram of a switching circuit in accordance with the preferred embodiment.

Referring now to FIG. 2, the welding type power circuit also includes, in switching circuit 108, four controllable switches 201-. Each switch 201-204 is connected to the output of transformer 107 to receive the welding type power from the shared power circuit. A work inductor 207 is connected between the shared power circuit and a shared output terminal 213. Thus, shared output terminal 213 receives the welding type power through work inductor 207 from the shared power circuit. Work inductor 207 is omitted in various embodiments. Shared output terminal 213 is the work terminal in the preferred embodiment. One alternative provides for two work terminals - one for each process. Controllable switch, as used herein, refers to a switch that can be opened or closed in response to a control input. Switches 201-204 each have a control input 221-224. Connected to, as used herein, refers to an electrical or logical connection made either with or without other components therebetween. In one preferred embodiment the shared output terminal is the work terminal. Connected between, as used herein, refers to an electrical connection made between two components or nodes, either with or without other components therebetween.

A process output terminal 210 is connected to controllable switch 202 such that when switch 202 is closed process output terminal 210 receives positive polarity welding type power from the shared power circuit, and EP welding type power is provided across shared output terminal 213 and process output terminal 210. When controllable switch 202 is open process output terminal 210 does not receive positive EP welding type power from the shared power circuit. Process output terminal 210 is a TIG/stick terminal in the preferred embodiment.

Process output terminal 210 is also connected to controllable switch 203 such that when switch 203 is closed process output terminal 210 receives welding type power from the shared power circuit, and EN welding type power is provided across shared output terminal 213 and process output terminal 210. When controllable switch 203 is open process output terminal 210 does not receive EN welding type power from the shared power circuit.

Switch 201 is connected to process output terminal 212. Process output terminal 212 is a MIG output terminal in the preferred embodiment. Process output terminal 212 is connected to controllable switch 201 such that when switch 201 is closed process output terminal 212 receives positive polarity welding type power from the shared power circuit, and EP welding type power is provided across shared output terminal 213 and process output terminal 212. When controllable switch 201 is open process output terminal 212 does not receive positive EP welding type power from the shared power circuit.

Process output terminal 212 is also connected to controllable switch 204 such that when switch 204 is closed process output terminal 212 receives welding type power from the shared power circuit, and EN welding type power is provided across shared output terminal 213 and process output terminal 212. When controllable switch 204 is open process output terminal 212 does not receive EN welding type power from the shared power circuit.

Thus, by selectively opening and closing switches 201-204 either EP or EN power is provided to one of the two output terminals. Preferably, switches 201-204 are controlled such that no more than one is one at any time. An EP MIG output is provided by having switch 201 on and switches 202-204 off. An EN MIG output is provided by having switch 204 on and switches 201, 202 and 203 off An AC MIG output can be provided by alternating switches 201 and 204. An EP TIG/stick output is provided by having switch 202 on and switches 201, 203 and 204 off An EN TIG/stick output is provided by having switch 203 on and switches 201, 202 and 204 off. An AC stick/TIG output is be provided by alternating switches 202 and 203. The on-times of switches 202 and 203 can be adjusted to provide the desired balance. This invention is particularly suitable for ac applications because AC requires output (or steering) switches, and those switches can also be used to select the process. Using the AC steering switch as the process selection switches process does not require the current to flow through any additional device and does not create any additional losses in the system.

Controllable switches 201-204 are semiconductor devices in the preferred embodiment, and are electro mechanical devices or vacuum tubes in alternative embodiments. Various embodiments provide that switches 201-204 are not all the same kind of switches. Electro mechanical device, as used herein, refers to relays or contactors.

Controller 109 is implemented at least partially using software in the preferred embodiment. Alternative embodiments include using discrete circuitry. Controller, as used herein, includes digital and analog circuitry, discrete or integrated circuitry, microprocessors, DSPs, etc., software, hardware and firmware, located on one or more boards, that form part or all of a controller, and are used to control a welding process, or a device such as a power source or wire feeder.

Controller 109 receives a process selection input on line 116. The process selection input is received from a user interface 115 that provides the process selection input as a user input in the preferred embodiment. User interface 115 is a selection switch, a selection knob, buttons, a selection menu, a touch screen, and a selection pro gram in various embodiments. User input, as used herein, refers to a signal responsive to a user selecting a parameter a process, such as selecting current, wire feed speed, MIG, tig or stick. Selection menu, as used herein, refers to a menu that includes choices such as buttons, switches, arrow, etc.

Figure 3:
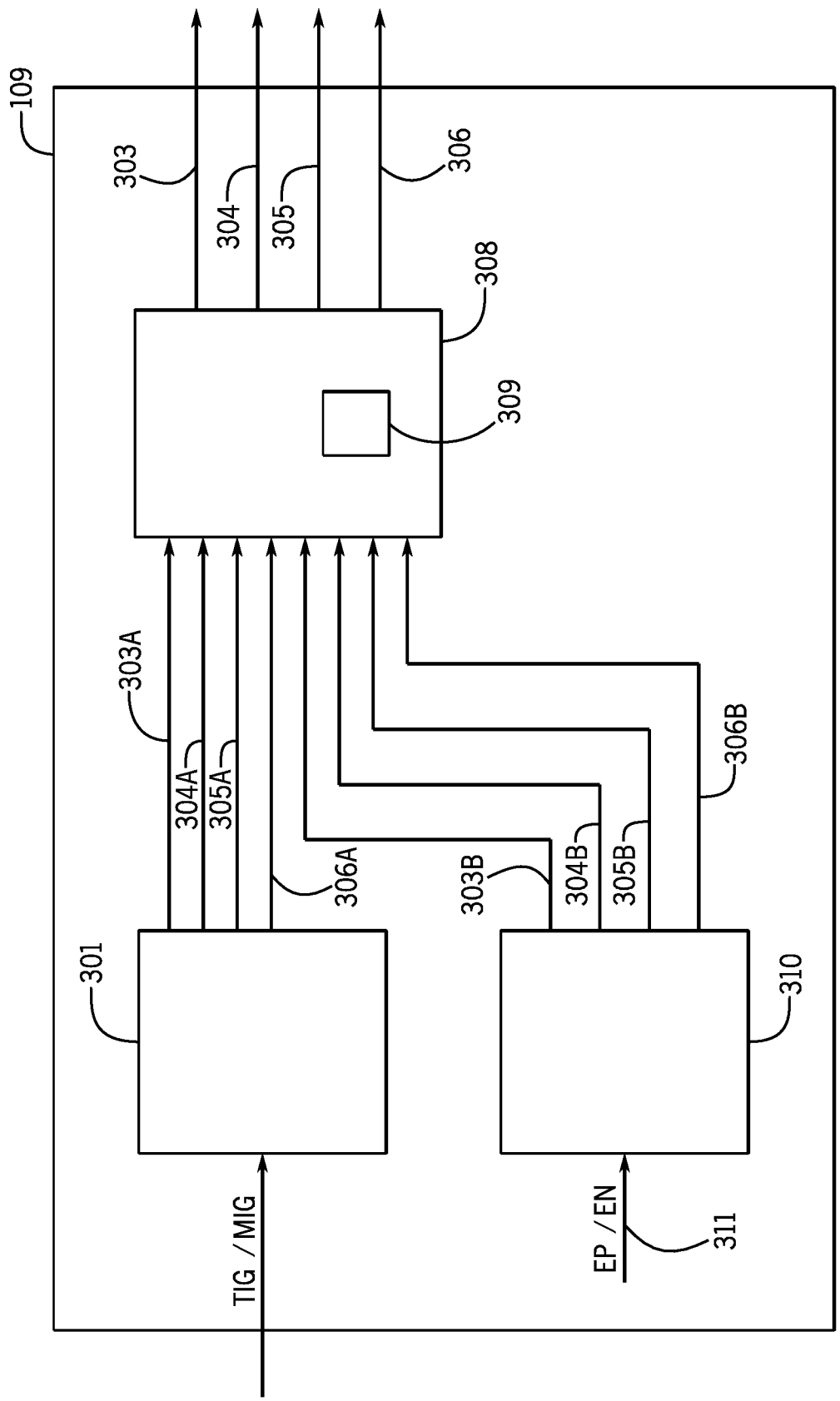
FIG. 3 is a block diagram of a controller in accordance with the preferred embodiment.

One embodiment of controller 109 is shown in FIG. 3, and includes a process selection module 301. The process selection input on line 116 is provided to process selection module 301. Process selection module 301 is responsive to the process selection input on line 116 and has four control outputs 303-306. Each control output 303-306 has an enable state and a disable state, and each control output 303-306 is connected, through a logic circuit 308, to one of control inputs 221-224 of switches 201-204. Logic circuit 308 and process selection module 301 provide that no more than one of the control outputs is in the enable state at any one time. Process selection module, as used herein, refers to a control module that selects one of two (or more) process output terminals to receive welding type power, and selects the remaining process output terminal (or terminals) to not receive welding type power. Control module, as used herein, may be digital or analog, and includes hardware or software, that performs a specified control function. Enable state for a control output, as used herein, refers to a state that enables a switch to be closed or an output to be provided. Disable state for a control output, as used herein, refers to a state that causes a switch to be open or prevents an output from being provided.

The embodiment shown in FIGS. 2 and 3 is well suited for AC welding or for a welding type system that allows provides either EP or EN power because it includes 4 switches. One alternative omits switches 203 and 204 and provides power to one of process output terminals 210 and 212 in only the EP mode. Another alternative includes switches 203 and 204, but omits switches 201 and 202 to provides power to one of process output terminals 210 and 212 in only the EN mode. In these embodiments logic circuit 308 may be omitted, and control outputs 303 and 304 (or control outputs 305 and 306) may be provided directly to control inputs 221 and 222 (or control inputs 223 and 224) without logic circuit 308 therebetween. The power from transformer 107 may be rectified in the desired polarity. In this embodiment switching circuit 308 is a process selection circuit. Process switching circuit, as used herein refers to a circuit that selects a process output terminal in response to a logic circuit and a process selection and a polarity selection.

Referring back to FIG. 2, a high frequency starting coil 208 is shown connected between stick/TIG output terminal 210 and switches 202 and 203, and power from the shared power circuit is provided through coil 208 to output terminal 210. Coil 208 is consistent with prior art high frequency starting coils and can be used to start a TIG or stick weld. Coil 208 is omitted in some embodiments. Coil 208 is only in the active power circuit when the TIG/STICK process and it is not burdening the system when MIG is being performed. Having it in the MIG circuit would reduce the available voltage and create additional losses in the system.

Figure 4:
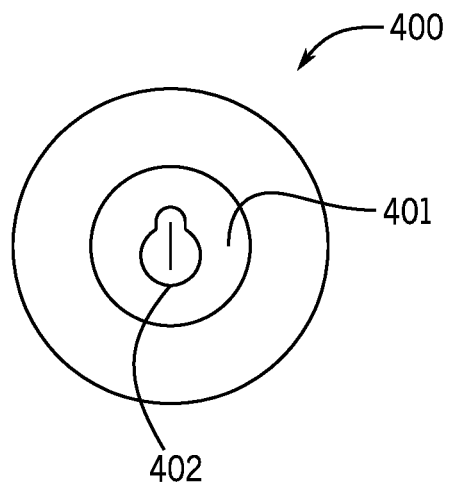
FIG. 4 is a diagram of a push and twist receptacle.

Process output terminal 210 is a Dinse™ receptacle in the preferred embodiment, such as receptacle 400 in FIG. 4. Receptacle 400 includes a copper receiver 401 having a notch 402. A protrusion on the mating plug is received in notch 402, and pushed past notch 402. Twisting the mating plug then secures the plug in receptacle 400. Alternative embodiments provide that process output terminal 210 is a different kind of push and twist receptacle or other quick connect connection (for example that found in U.S. Pat. No. 7,682,208), or a non-quick connect such as hard wired. Process output terminal is hard wired to wire feeder 111 in the preferred embodiment, but can be connected using a quick connect connection. Push and twist style receptacle as used herein, refers to a receptacle that receives a cable and wherein the cable is pushed in and held in place by turning the cable, and example include (but are not limited to) a Dinse® connector, a Tweco® connector, or the connector shown in U.S. Pat. No. 7,682,208.

Using a push and twist style receptacle for output terminal 210 is particularly well suited when process output terminal 210 is a stick/TIG terminal. When stick/TIG is one process selection, and MIG the other, user interface 115 allows the user to select the process, and then provides the user input to process selection module 301 to allow the user to select at least one of at least MIG, tig and stick.

An alternative provides for determining the desired process without requiring the user to affirmatively select the process. For example, feedback on lines 112 can be used to determine whether a cable is connected to tig/stick terminal 210. If a working connection is being made to process output terminal 210 then process output terminal 210 is enabled and 212 disabled (using switches 201-204). Conversely, whether or not something connected to terminal 212 could be sensed. Alternatives provide sensing if a trigger, foot pedal, or a finger tip control has been activated by the user. If so, then power is provided to the appropriate process output terminal. Working connection, as used herein, refers to a connection being made to an output terminal that indicates the user intends to use that output terminal, such as connecting a cable to a dinse connector, or connecting a wire feeder to a power supply.

Another alternative provides for a lockout to prevent switching process output terminal while power is being provided (or while a weld is occurring). Logic circuit 308 includes a disable module 309 in this embodiment. Disable module 309 receives feedback indicative of whether a weld is being performed on lines 112. If a weld is being performed, the output process terminal that is not enabled remains not enabled, even if the user changes the process selection. Alternatives include sensing the power being provided in other locations, including in the shared power circuit, for example on lines 114. Disable module, as used herein, refers to a module that disables or locks out a process selection module so that the process elected remains selected even if a process selection input changes.

The preferred embodiment provides for output polarity selection and output process selection and controller 109 includes a polarity selection module 310 that receives a polarity selection input 311. Polarity selection input 311 can be from a user input that selects EP, EN or AC. The user input is a polarity selection switch, a polarity selection knob, buttons, a polarity selection menu, a touch screen, and a selection program in various embodiments. Polarity selection input, as used herein, refers to a signal that indicates a particular polarity output is desired. Polarity selection module, as used herein, refers to a control module that selects the polarity of the output, and can select the polarity to remain at one polarity, or select it to alternate for ac welding.

When AC is selected polarity selection module 310 and can include a balance control to determine the balance between EP and EN, and a cycle length control. Switches 201 and 202 receive EP power, and switches 203 and 204 receive EN power. Thus, when EP is to be provided switches 203 and 204 are disabled by polarity module 310 using control outputs 305 and 306, and when EN is is to be provided switches 201 and 202 are disabled by polarity module 310 using control outputs 303 and 304. Switches 202 and 203 are connected to stick/TIG terminal 210, and switches 201 and 204 are connected to MIG terminal 212. Thus, when stick/TIG is selected switches 201 and 204 are disabled by process selection module 301 using control outputs 303 and 306, and when MIG is selected switches 202 and 203 are disabled by process selection module 301 using control outputs 304 and 305. Logic circuit 308 "ANDS" the enable/disables, leaving no more than one of control outputs 303-306 in the enable state at any one time.

Figure 5:
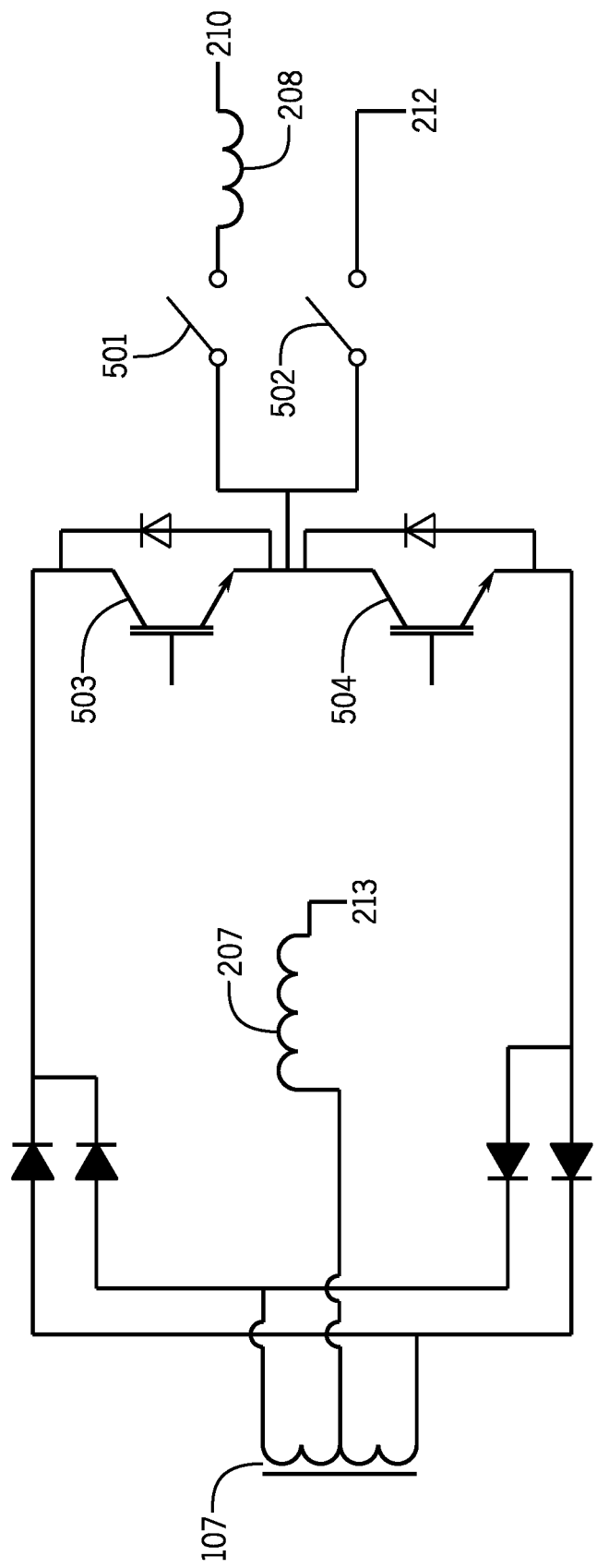
FIG. 5 is a schematic diagram of a switching circuit in accordance with the preferred embodiment.

The embodiment of FIG. 2 provides that switches 201-204 are each responsive to both polarity selection module 310 and process selection module 301. An alternative shown in FIG. 5 provides that two switches responsive to polarity selection module 310 and two other switches are responsive to process selection module 301. In this alternative switches 501 and 502 select which process output terminal will receive power, and switches 503 and 504 steer the output as EP or EN. In this embodiment switches 501 and 502 are electro mechanical devices.

Process selection module 301, polarity selection module 310 and logic circuit 309 can be implemented in software, hardware, or both. The code can be written in any number of ways, and one example, where STICK is the variable indicating stick/TIG is selected and EP is the variable indicating the output is to be EP, is:

```
IF STICK AND EP
THEN
    304 = Enable
    303, 305, 306 = Disable
ELSE IF NOT STICK AND EP
THEN
    303 = Enable
    304, 305, 306 = Disable
ELSE IF STICK AND NOT EP
THEN
    305 = Enable
    303, 304, 306 = Disable
ELSE IF NOT STICK AND NOT EP
THEN
    306 = Enable
    303, 304, 305 = Disable
END IF
```

Figure 6:
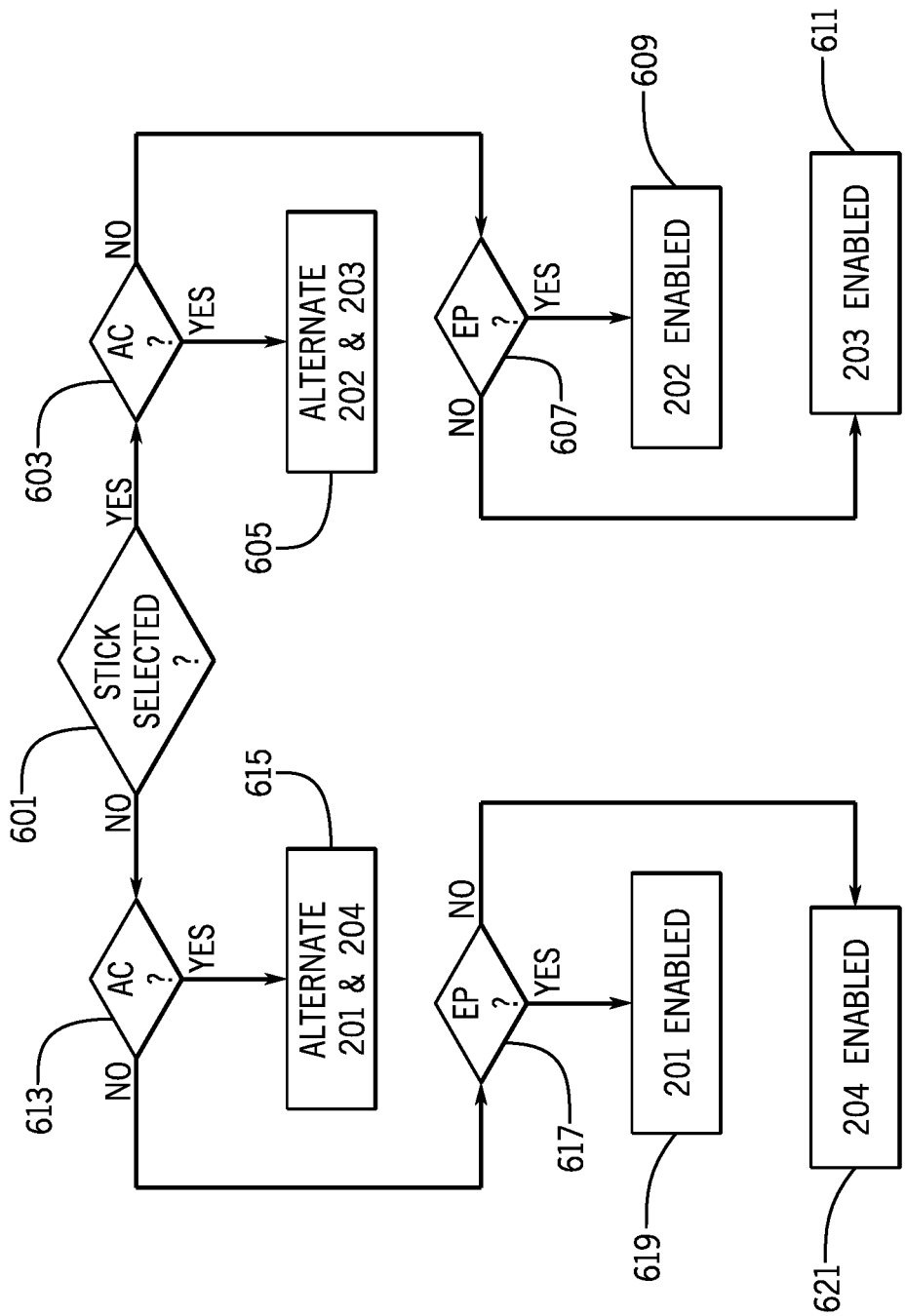
FIG. 6 is a flow chart of part of a controller in accordance with the preferred embodiment.

FIG. 6 shows a flow chart 601 that can be used to implement modules 301 and 310. At 601 it is determined STICK is true. If STICK is true, then at 603 it is determined if AC is desired. If AC is desired, then switches 202 and 203 are alternated on and off, and switches 201 and 204 are off at step 605. If AC is not desired, then it is determined if EP is desired at 607. If EP is desired, then switch 202 is on and switches 201, 203 and 204 are off at step 609. If EP is not desired, then switch 203 is on and switches 201, 202 and 204 are off at step 611. If stick was not true at 601, then at 613 it is determined if AC is desired. If AC is desired at 613, then switches 201 and 204 are alternated on and off, and switches 202 and 203 are off at step 615. If AC is not desired at step 613, then it is determined if EP is desired at 617. If EP is desired at step 617, then switch 201 is on and switches 202, 203 and 204 are off at step 619. If EP is not desired at step 617, then switch 204 is on and switches 201, 202 and 203 are off at step 621.

Figure 7:
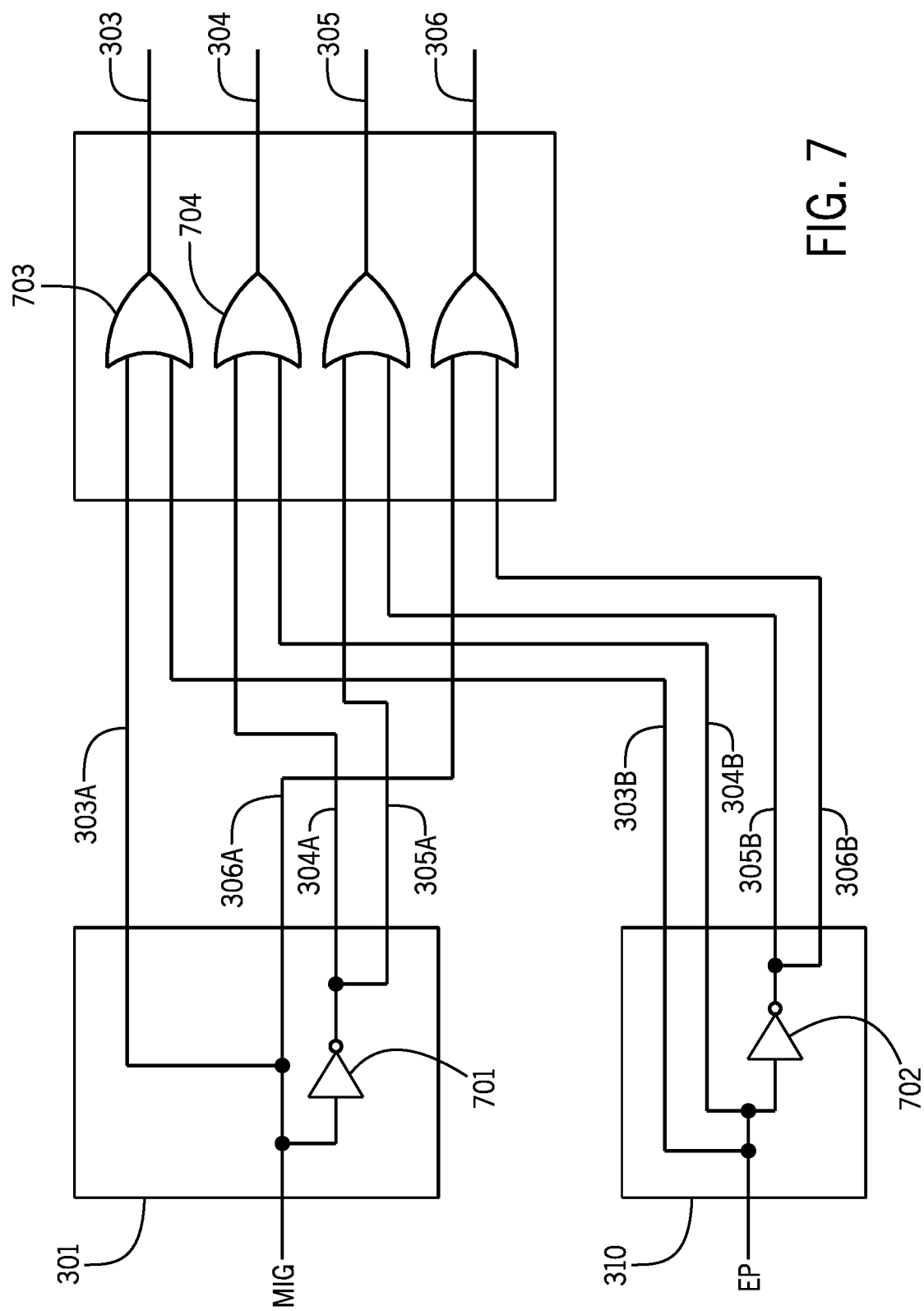
FIG. 7 is a schematic diagram of part of a controller in accordance with the preferred embodiment.

FIG. 7 shows a circuit that implements modules 301, 308 and 309. Process selection module 301 receives a signal that is TRUE when MIG is desired. Outputs 303A and 306A are TRUE when MIG is desired, and outputs 304A and 305A are FALSE via NOT gate 701 when MIG is desired. The reverse occurs when stick is desired. Polarity selection module 301 receives a signal that is TRUE when EP is desired. Outputs 303B and 304B are TRUE when EP is desired, and outputs 305B and 306B are FALSE via NOT gate 702 when EP is desired. The reverse occurs true when EN is desired. Logic circuit 308 includes AND gates 703-706 which "AND" the various signals to provide control outputs 303-306.

Figure 8:
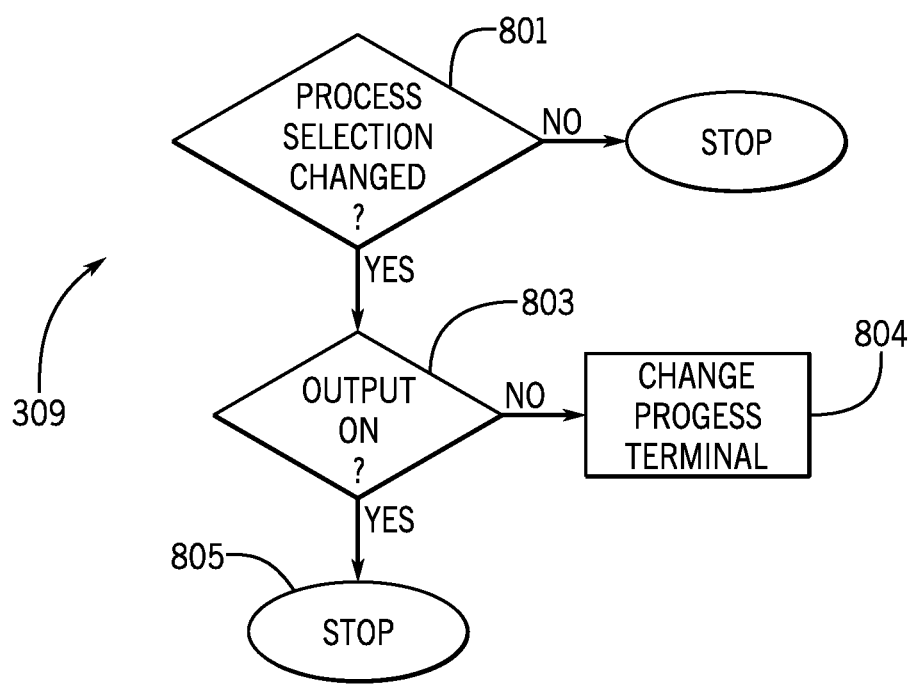
FIG. 8 is a flow chart of part of a controller in accordance with the preferred embodiment.

FIG. 8 is a flow chart implementing the lock out feature of disable module 309. This prevents changing output terminal under load. It is determined at 801 if the process selection input has changed. If the process selection input has changed then it is determined at 803 if power is being provided as an output. If power is being provided as an output then no change is made. If power is not being provided, then the active process output terminal is changed at 804.

Controller 109 provides many functions consistent with the prior art, including controlling the output magnitude, wave shape, balance, etc. Those feature can be implemented as they were in the prior art.

Numerous modifications may be made to the present disclosure which still fall within the intended scope hereof. Thus, it should be apparent that there has been provided a method and apparatus for providing welding type power that fully satisfies the objectives and advantages set forth above.

Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The invention claimed is:

1. A welding type system for providing welding type power, comprising:
   a process selection input;
   a welding type power circuit, including a shared power circuit that produces the welding type power, a first controllable switch having a first control input connected to receive the welding type power from the shared power circuit, and a second controllable switch having a second control input and connected to receive the welding type power from the shared power circuit;
   a shared output terminal connected to receive the welding type power from the shared power circuit;
   a first process output terminal, connected to the first controllable switch such that when the first controllable switch is closed the first process output terminal receives the welding type power from the shared power circuit and the welding type power is provided across the shared output terminal and the first process output terminal, and such that when the first controllable switch is open the first process output terminal does not receive the welding type power from the shared power circuit;
   a second process output terminal, connected to the second controllable switch such that when the second controllable switch is closed the second process output terminal receives the welding type power from the shared power circuit and the welding type power is provided across the shared output terminal and the second process output terminal, and such that when the second controllable switch is open the second process output terminal does not receive the welding type power from the shared power circuit; and
   a controller, connected to receive the process selection input, and having a process selection module responsive to the process selection input and having a first control output having an enable state and a disable state, wherein the first control output is connected to the first control input, and having a second control output having the enable state and the disable state, wherein the second control output is connected to the second control input, wherein no more than one
   process selection input;
   a welding type power circuit, including a shared power circuit that produces the welding type power, a first controllable switch having a first control input connected to receive the welding type power from the shared power circuit, and a second controllable switch having a second control input and connected to receive the welding type power from the shared power circuit;
   a shared output terminal connected to receive the welding type power from the shared power circuit;
   a first process output terminal, connected to the first controllable switch such that when the first controllable switch is closed the first process output terminal receives the welding type power from the shared power circuit and the welding type power is provided across the shared output terminal and the first process output terminal, and such that when the first controllable switch is open the first process output terminal does not receive the welding type power from the shared power circuit;
   a second process output terminal, connected to the second controllable switch such that when the second controllable switch is closed the second process output terminal receives the welding type power from the shared power circuit and the welding type power is provided across the shared output terminal and the second process output terminal, and such that when the second controllable switch is open the second process output terminal does not receive the welding type power from the shared power circuit; and
   a controller, connected to receive the process selection input, and having a process selection module responsive to the process selection input and having a first control output having an enable state and a disable state, wherein the first control output is connected to the first control input, and having a second control output having the enable state and the disable state, wherein the second control output is connected to the second control input, wherein no more than one of the first control output and the second control output can be in the enable state at any one time, wherein the process selection module includes a of the first control output and the second control output can be in the enable state at any one time.

2. The welding type system of claim 1 wherein the shared output terminal is a work terminal.

3. The welding type system of claim 2, further comprising at least one of a work inductor connected between the shared output terminal and the shared power circuit, and a high frequency starting coil connected between the first process output terminal and the first controllable switch.

4. The welding type system of claim 2 wherein the first process output terminal is a push and twist style receptacle and the second process output terminal is connectable to a wire feeder, and wherein the first process output terminal provides at least one of a stick output and a tig output, and wherein the second process output terminal provides a MIG output, and wherein the process selection input is a user input for selecting at least one of at least MIG, tig and stick.

5. The welding type system of claim 2 wherein the first controllable switch and the second controllable switch are one of semiconductor devices, electro mechanical devices, and vacuum tubes.

6. The welding type system of claim 5 wherein the user input is at least one of a selection switch, a selection knob, buttons, a selection menu, a touch screen, and a selection program.

7. The welding type system of claim 2 wherein the process selection input is responsive to at least one of a signal indicative of a working connection being made to at least one of the first process output terminal and the second process output terminal, a trigger, a foot pedal, or a finger tip control.

8. The welding type system of claim 2 wherein the shared power circuit includes a preregulator having a boost circuit, an inverter, a transformer, and a rectifier, wherein an output of the boost circuit is connected to a boosted bus, and an input of the inverter is connected to the boosted bus, an output of the inverter is connected to an input of the transformer, and an output of the transformer is connected to an input of the rectifier, and an output of the rectifier is connected to the first controllable switch and the second controllable switch.

9. The welding type system of claim 1, further comprising a polarity selection input, wherein:
   the first controllable switch and the second controllable switch are connected to receive a first polarity of the welding type power from the shared power circuit;
   the welding type power circuit further comprises a third controllable switch having a third control input and connected to receive a second polarity of the welding type power from the shared power circuit, and a fourth controllable switch having a fourth control input and connected to receive the second polarity of the welding type power from the shared power circuit; and
   the controller is further connected to receive the polarity selection input and the controller further includes a polarity selection module responsive to the polarity input, and further having a third control output responsive to the polarity selection module and having the enable state and the disable state, wherein the third control output is connected to the third control input, and having a fourth control output responsive to the polarity selection module and having the enable state and the disable state, wherein the fourth output is connected to the fourth control input, wherein no more than one of the third control output and the fourth control output can be in the enable state at any one time.

10. The welding type system of claim 9, wherein the polarity selection input is at least one of a polarity selection switch, a polarity selection knob, buttons, a polarity selection menu, a touch screen, and a selection program.

11. The welding type system of claim 9, wherein:
   the first process output terminal is connected to the third controllable switch such that when the third controllable switch is closed the first process output terminal receives the second polarity of the welding type power from the shared power circuit;
   the second process output terminal is connected to the fourth controllable switch such that when the fourth controllable switch is closed the second process output terminal receives the second polarity of the welding type power from the shared power circuit;
   the first control output is responsive to the polarity selection module and the process selection module;
   the second control output is responsive to the polarity selection module and the process selection module;
   the third control output is responsive to the polarity selection module and the process selection module;
   the fourth control output is responsive to the polarity selection module and the process selection module; and
   wherein no more than one of the first control output, the second control output, the third control output, and the fourth control output are in the enable state at one time.

12. The welding type system of claim 11 wherein the third controllable switch and the fourth controllable switch are semiconductor devices.

13. The welding type system of claim 9, wherein the third controllable switch is connected between the shared power circuit and a node common to the first controllable switch and the second controllable switch and wherein the fourth controllable switch is connected between the shared power circuit and the node common to the first controllable switch and the second controllable switch, such that:
   when the first control output and the third control output are enabled the first process output terminal receives the first polarity of the welding type power from the shared power circuit;
   when the first control output and the fourth control output are enabled the first process output terminal receives the second polarity of the welding type power from the shared power circuit;
   when the second control output and the third control output are enabled the second process output terminal receives the first polarity of the welding type power from the shared power circuit; and
   when the second control output and the fourth control output are enabled the second process output terminal receives the second polarity of the welding type power from the shared power circuit.

14. The welding type system of claim 13 wherein the first switch and the second controllable switch are electro mechanical devices.

15. A welding type system for providing welding type power, comprising:
   disable module responsive to feedback indicative of welding type power being provided to at least one of the first process terminal and the second process terminal.

16. A method of providing welding type power, comprising:
   sensing a process selection input, wherein sensing the process selection input includes sensing at least one of a selection switch, a selection knob, buttons, a selection menu, a touch screen, and a selection program;
   receiving input type power;
   providing welding type power from a shared power circuit across a shared work terminal and only one of a first process terminal and a second process terminal in response to sensing the process selection input, wherein providing welding type power across the shared work terminal and the first process terminal includes closing a first controllable switch and opening a second controllable switch, and wherein providing welding type power across the shared work terminal and the second process terminal includes closing the second controllable switch and opening the first controllable switch; and
   preventing changes to the state of the first controllable switch and the second controllable switch while welding power is being provided to one of the first process terminal and the second process terminal.

17. The method of claim 16 wherein sensing the process selection input includes sensing a user input indicative of at least one of at least MIG, tig and stick.

18. The method of claim 16 wherein sensing the process selection input includes sensing a signal indicative of a working connection being made to at least one of the first process output terminal and the second process output terminal, a trigger, a foot pedal, or a finger tip control.

* * * * *